Figure 1:
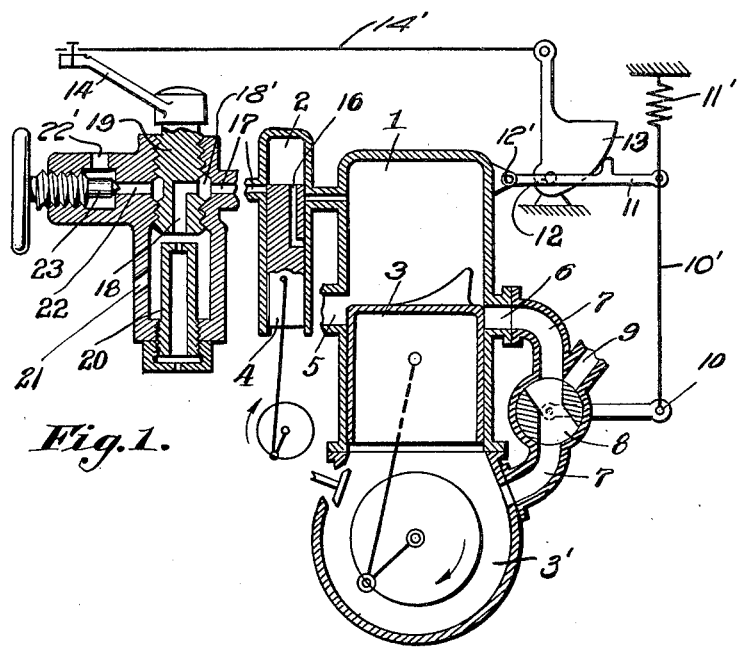

Inventor.
Franz Mädler
by
Adolph A. Thomas
Attorney

Patented June 30, 1925.

1,543,717

UNITED STATES PATENT OFFICE.

FRANZ MÄDLER, OF BERLIN, GERMANY, ASSIGNOR TO MAEDLER ENGINE CORPORATION, OF CLEVELAND, OHIO, A CORPORATION OF MARYLAND.

INTERNAL-COMBUSTION ENGINE.

Application filed February 17, 1923. Serial No. 619,772.

*To all whom it may concern:*

Be it known that I, FRANZ MÄDLER, a citizen of Germany, residing at 21 Emserstrasse, Berlin W., Germany, have invented certain new and useful Improvements in Internal-Combustion Engines, of which the following is a specification.

My present invention relates to internal combustion engines, and its object is to provide means and methods for properly regulating and preparing the fuel charge and controlling the air charge under all conditions of speed and load, and at the same time automatically utilizing the kinetic energy of the exhaust gases to help scavenge, cool and recharge the working cylinder.

When applied to a four or more cylinder two-stroke internal combustion engine, one feature of my invention comprises an ejector construction in the exhaust passages, whereby the kinetic energy of the exhaust gases automatically helps to draw through the working cylinders, in proper succession, the required quantity of air for scavenging, cooling and recharging the cylinders.

According to another feature of my invention, it is possible to regulate the amount of air compressed in the working cylinder and regulate the prepared fuel charge so that the air charge bears such proportion to the injected fuel charge that the combustible mixture formed in the working cylinder produces the best practical engine efficiency under varying conditions of load and speed.

In order to insure the scavenging and recharging of the working cylinders under varying conditions of speed and load, I provide a blower to help the kinetic energy of the exhaust gases draw the requisite amount of air through the working cylinders. The degree of kinetic energy in the exhaust gases is in direct relation to the highest pressure reached in the working cylinder (at a given timing of the opening of the exhaust port), and this pressure depends upon the quantity of air enclosed therein for compression by the piston on its inward movement and upon the quantity of fuel used. Given a correct explosive or combustible mixture (I use the terms synonymously), the velocity of the exhaust gases through the ejector construction referred to depends upon the degree of pressure reached in the working cylinder. When the pressure in the cylinder is sufficiently high, the exhaust gases will have volume and velocity sufficient to materially help scavenge, cool and recharge the cylinder. Under certain conditions, the kinetic energy of the exhaust gases may be sufficiently high to relieve the blower entirely of its load. When the pressure in the working cylinder is low, as under light load or no-load conditions, the velocity of the exhaust gases is correspondingly low and the load on the blower is increased to provide the air necessary to perform the required scavenging and recharging operations. It will be understood that the blower is mechanically driven and absorbs power to operate it. Now, one of the features of my invention permits the saving of a substantial portion of this power by utilizing the ejector action of the exhaust gases to cause scavenging and recharging air to be brought through the working cylinder, thereby relieving the blower from supplying all the air necessary for scavenging and recharging. This lessens the load on the blower and consequently increases the mechanical efficiency of the engine.

In order to explain the principles and operation of my invention, I have shown in the accompanying drawings two illustrative embodiments containing the various features of my invention. For the sake of simplicity, these drawings are merely diagrammatic and show only so much of an engine as is necessary for an understanding of my invention. In these drawings—

Figure 2:
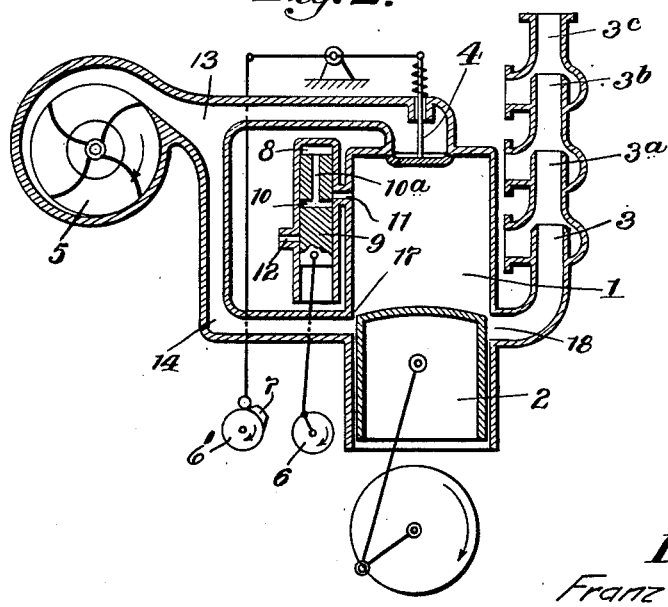

Fig. 1 illustrates diagrammatically, in cross-section through a single cylinder, a four-cylinder two-stroke engine constructed in accordance with my invention; and Fig. 2 is a similar view of a modification in which a turbo-blower and an ejector exhaust manifold are shown attached.

In Fig. 1, there is a working cylinder 1 provided with a piston 3 and an exhaust port 5. The crank case 3' is adapted to be used as a blower to supply air through a pipe or passage 7 connected with a scavenging inlet port 6. The pipe 7 is provided with a controlling device or valve 8, which can be turned to control the amount of air supplied to the cylinder by varying the proportion of air passing through the opening 9 into the atmosphere.

Connected with the working cylinder 1 through a channel 15 is an auxiliary cylinder 2 provided with a reciprocating piston 4, which has a bore or channel 16. The auxiliary cylinder 2 connects with a fuel-supply device through pipe 17, this device being shown on an enlarged scale at the left of the auxiliary cylinder 2. The pipe 17 connects with a passage 18 formed in a threaded spindle 19. This spindle has an annular groove 18' which connects with the transverse part of passage 18, so that, when the spindle 19 is screwed up or down, the connection between passage 18 and the suction pipe 17 always remains open. The fuel is carried from nozzle 20 by air or other gaseous medium sucked through the opening 21 by the vacuum created in the auxiliary cylinder 2. A regulating passage 22 is connected with the air or other gaseous medium through a port 22'. The regulating passage 22, controlled by a throttling member 23, leads into the annular groove 18' of the spindle 19. The spindle 19 is equipped with a regulating handle or lever 14 for raising and lowering the spindle.

The scavenging and air charging valve 8 is controlled by a lever 10 which is linked to lever 11 by a suitable connection 10'. The lever 11 is pivoted to a fixed point 12', and is arranged to be controlled by the movements of a cam 13, pivoted at 12. A spring 11' holds the lever 11 against the curved surface of cam 13. The cam 13 is connected to the lever 14 by a suitable connection 14', whereby the lever 14 and cam 13 are adjusted to regulate the fuel and air charge proportionately to the speed and load of the engine. That is to say, when the valve 8 is operated to vary the volume of air compressed in the working cylinder, the lever 14 is controlled so as to regulate the quantity of fuel sucked by the vacuum into the auxiliary cylinder 2, so that at all speeds and loads the most efficient mixture of fuel and air will be consumed in the working cylinder. Cam 13 is operated in any convenient manner.

The piston 4 in the auxiliary cylinder 2 is so arranged that when it moves outwardly a predetermined vacuum is created in the cylinder 2. Shortly after the auxiliary piston 4 reaches its bottom dead center, connection is established with pipe 17 and the vacuum acts on the fuel-supply device to draw in a fixed volume of gaseous medium carrying with it a predetermined amount of fuel. The vacuum is independent of the engine speed and produces a practically constant velocity of the gaseous medium in the passage 18. The passage 18 is located directly over the fuel nozzle 20. By raising or lowering the spindle 19, the area of the air passage at the fuel nozzle is changed, so that the speed of flow of the air at the fuel nozzle, and hence the quantity of fuel carried into the auxiliary cylinder 2 by the air or gaseous medium, can be regulated independently of the engine speed and load.

It should be noted that, when the handle or lever 14 is turned, the cam 13 is simultaneously swung around on its pivot 12, and the lever 11 is deflected by the curved surface of the cam. This curved surface is so shaped and proportioned as to control the air inlet valve 8 in such a manner that the quantity of air compressed in the working cylinder will always be such as will give the most efficient combustible mixture when combined with the fuel injected from auxiliary cylinder 2 through passage 15. When the atmospheric pressure is different from that for which the engine is adjusted, or when a fuel of different heat value is used, the quantity of air or gaseous medium let in through the regulating channel 22 can be varied by the throttling member 23 for the purpose of controlling the speed of flow of the air at the fuel nozzle 20. This does not affect the proportion of air units and hydrocarbon units confined in the working cylinder at the various positions of the fuel and air control members.

A serious drawback in two-cycle internal combustion engines hitherto proposed is that the burnt gases cannot be cleared out of the explosion chamber of the cylinder by scavenging air in a satisfactory manner. This drawback is particularly serious in high speed engines in which the scavenging is performed by the piston of the engine itself or by a separate pump. Another objection in engines of the present type, and particularly in motor car engines, is that the explosive mixture is forced in and used for driving out the products of combustion left in the explosion chamber after the power stroke. Such engines can only be regulated in an unsatisfactory manner and they consume an excessive amount of fuel.

In order to overcome the foregoing objections and difficulties, it is necessary to scavenge the cylinder very thoroughly. The pressure by which the burnt gases are expelled should be as constant as possible during the scavenging period, so as to remove the burnt residual gas from the cylinder in a uniform manner and to prevent the formation of eddies. Another requirement to be met is that the scavenging should be performed with fresh air only, so as to obviate backfiring and losses of fuel. Furthermore, provision should be made for the effective internal cooling of two-cycle engines, particularly in the case of air-cooled engines. The carburetor arrangements in use at the present day are unsuitable for two-cycle engines. In order to adapt the gas mixture to all possible engine speeds, it is necessary to provide a method by which the mixture of fuel and air is regulated so as to give the highest possible efficiency at each particular speed and load.

These objects are accomplished by my invention, which enables two-cycle engines to be constructed that fulfill all requirements which an engine of high efficiency has to meet. In these engines, according to a further feature of the invention, the kinetic energy of the exhaust gases is utilized to assist a blower in passing the greatest possible volume of air through the working cylinder for scavenging and recharging purposes. When the multiple ejector effect of the exhaust gases in multi-cylinder engines is utilized, it is necessary to avoid appreciable pressure fluctuations due to the rarefaction or partial vacuum produced in the working cylinders, because otherwise oscillations will be set up in the exhaust manifold system which will give rise to considerable resistances therein.

The invention also provides a positive regulation of the air and the fuel charge, and the fuel charge is introduced into the working cylinder for the purpose of forming an explosive mixture only when a properly proportioned air charge is enclosed in the working cylinder.

By passing a large volume of air through the cylinder, a very considerable cooling of the working cylinder is accomplished. This is particularly important in the scavenging of air-cooled engines. Since an increased engine speed or an increased combustion pressure in the working cylinder entails a greater ejector effect and the passing through the cylinder of a larger quantity of air, an increase of load is accompanied by a more effective cooling of the interior of the cylinder. When the engine speed, or the degree of pressure in the cylinder is very small, the ejector effect is nil. The ejector action would also be disturbed by the failure of a spark plug. Under these conditions, a turbo-blower on the engine takes up the function of supplying the requisite scavenging air. This turbo-blower offers practically no resistance. The two effects, the ejector effect and the blower effect, compensate each other, for when the engine speed is low, the scavenging is effected by the turbo-blower, and when the engine speed increases, the ejector effect of the exhaust gases begins to act. Scavenging air fluctuations due to ejector effect, and such fluctuations as are produced by spark plug failures, are taken care of by the turbo-blower.

The foregoing features of my invention are exemplified in Fig. 2, which is an illustration of the essential parts of a four-cylinder two-cycle engine constructed according to my invention. In the working cylinder 1 reciprocates a working piston 2. When the piston 2 executes a downstroke, it opens the exhaust port 18. After the exhaust gases have had time to expand through the pipes 3, the piston 2 opens the scavenging ports 17, which are connected through a pipe 14 with the pipe 13 from the turbo-blower 5. This pipe 13 also leads through a scavenging valve 4 into the working cylinder 1. The exhaust pipes of the three other working cylinders of the engine are diagrammatically represented by $3^a$, $3^b$ and $3^c$. An auxiliary cylinder 8 has a piston 9 provided with passages 10 and $10^a$. In the top dead center position of the piston 9, the passage 10 is connected through a port 11 with the working cylinder. As soon as the piston 9 starts to descend, it closes port 11. When the piston 9 is in its lowest position, the passage 10 communicates with the suction pipe 12 connecting with a fuel-supply device, which may be like that shown at the left of Fig. 1. The auxiliary piston 9 is driven by a crank arranged on a cam shaft 6. A cam shaft 6' carries a cam 7 to control the scavenging valve 4.

The operation of the engine is as follows:

When the working piston executes a downstroke, it opens the exhaust ports 18. Under full load, the exhaust gases expand at a speed of about 800 to 900 meters per second. After the gas in the cylinder 1 has expanded, the scavenging ports 17 are opened and in this position the scavenging valve 4 also opens. On the return or upstroke of the piston 2, the scavenging port 17 is closed first, then the exhaust ports 18 are closed and then the scavenging valve 4 is closed at a predetermined later interval. Since the exhaust periods in a four-cylinder two-cycle engine may be made to overlap each other, the exhaust gases, escaping at a high speed, exert a sort of ejector effect on each other and produce a partial vacuum. This partial vacuum cannot become considerable, because, on account of the overlapping of the exhaust periods with each other, the exhaust pipes are always in connection with one cylinder whose ports 17 and valve 4 will be open. This partial vacuum draws air from the blower pipe 13 through the cylinders. The blower 5 offers practically no resistance, so that an excessive vacuum in the cylinders is avoided. It is necessary to avoid oscillations in the exhaust pipe that would give rise to considerable resistance, therefore a continuous current is made to flow through the exhaust pipe, which is constructed in multiple ejector form.

When the engine runs slowly, the speed of flow of the exhaust gases, when the exhaust ports 18 are opened, sinks to such a degree that finally no ejector effect can take place. When this happens, the air draft for scavenging purposes is produced by the turbo-blower. The capacity of this blower is such that an ample quantity of scavenging air is blown through the cylinder after each firing stroke. As the pressure in a turbo-blower increases as the square of the speed, while the speed of the issuing air increases in proportion to the square root of the pressure, the amount of air supplied when the engine speed drops remains practically constant, because when the speed of revolution is slow the time which a unit quantity of air has for passing through the cylinder increases in proportion.

Therefore, when the motor carries little or no load, the scavenging action is performed by the turbo-blower. When the load increases, the ejector effect of the exhaust gases rises until, at the maximum load, the highest vacuum is produced and the load on the blower is at a minimum.

Since an increase of the load (which entails an increased development of heat in the engine) is accompanied by an increase of the quantity of air sent through the working cylinder, a greater cooling effect will be produced in the interior of the engine this effect growing as the load increases. This cooling effect is very considerable, because about three to five times the piston-stroke volume of air can be passed through the working cylinder after every power stroke. At a low speed, the cooling of the interior of the cylinder falls off, because then the turbo-blower alone produces the scavenging air and this then amounts to 1½ to 1¾ times the volume of the piston stroke. By this arrangement, the temperature of the working cylinder is kept constant within narrow limits, and this enable the construction of air-cooled motors for varying loads.

The air charge in the working cylinder 1 is regulated by altering the angular position of the cam shaft 6 with the cam 7 in relation to the crank shaft. When this is done, the closure of the scavenging valve 4 takes place at a correspondingly different time. By the time the valve 4 is closed, the piston 2 will, of course, have pushed some of the air charge in the cylinder 1 back into the pipe 13. Hence, by altering the point of engagement between the crank shaft and the cam shaft, any desired amount of air can be caused, by mechanically controlled means, to be enclosed in the working cylinder. This regulation or control is independent of the speed of rotation of the motor.

In Fig. 2, the piston 2 is shown in the act of closing the exhaust ports 18. On the particular timing shown in this diagrammatic view, the scavenging valve 4 is also closed by the cam 7, so that this is the timing of valve 4 for enclosing the largest possible air charge in the cylinder. Also, in this diagram, the timing of the pump piston 9 is so arranged that the passage 10 is about to establish a connection between the chamber 8 in the auxiliary cylinder and the main cylinder through the port 11. When the channel 10 registers with the port 11, the compressed fuel charge in chamber 8 is sprayed at constant velocity into the working cylinder independent of the engine speed and load, and combines with the air charge in the working cylinder to form a combustible mixture.

When the main piston 2 continues its upstroke, in the particular timing arrangement shown as an illustrative example in Fig. 2, the enclosed mixture thus formed is compressed, while the piston 9 disconnects the passages 10 and 11, and draws in a new fuel-charge. After the mixture in the main cylinder is compressed, it is ignited by a suitable ignition means. The spraying of the fuel into the working cylinder is performed only after the proper amount of air has been enclosed, in order to obviate all losses of fuel. Since the auxiliary piston drive and cam 7 are timed in proper relationship to each other, the fuel charge can be sprayed into the main cylinder only after the closure of valve 4, even if the point of engagement between the crank shaft and the cam shafts 6 and 6' is altered. Obviously, the relative timing of valve 4 and pump piston 9 can be so adjusted that the fuel injection takes place at any predetermined time after the closing of valve 4. In other words, the interval between the closing of valve 4 and the injection of the highly compressed fuel charge may be varied over a wide angle of crank shaft movement, and this allows the prepared fuel to be injected at any predetermined moment into the less highly compressed air charge in the working cylinder.

Since the vacuum produced during the outstroke of the auxiliary piston 9 is always substantially the same at all speeds of the engine, all that is necessary to change the quantity of fuel introduced into the engine is to alter the area of the air passage at the fuel nozzle by moving a lever or other suitable member. At the same time, this member may also control the relationship of the cam shafts to the crank shaft, so that the correct quantity of air is always enclosed in the working cylinder to secure the highest possible working efficiency from the engine.

I claim:

1. The method of increasing the efficiency of two-cycle internal combustion engines, which comprises regulating the volume of air compressed in the working cylinder, injecting a compressed prepared fuel charge into the air charge enclosed in the working cylinder, said air charge being at a lower pressure than said compressed fuel charge, regulating the amount of injected fuel charge in such proportion to the enclosed air charge that the resultant combustible mixture produces a power stroke of the highest practical efficiency at varying speeds and loads of the engine, causing a blower to maintain a sufficient supply of air for properly scavenging, cooling and recharging the working cylinder under varying conditions of load and speed, and utilizing a portion of the kinetic energy of the combustion gases to relieve the load on the blower.

2. The method of efficiently utilizing fuels of different heat values in two-stroke internal combustion engines, which comprises regulating the volume of air compressed in the working cylinder, injecting a compressed prepared fuel charge into the less highly compressed air charge enclosed in the working cylinder, regulating the amount of injected fuel charge in such proportion to the enclosed air charge that the resultant combustible mixture produces a power stroke of the highest practical efficiency at varying speeds and loads of the engine, varying the quantity of fuel prepared for injection in accordance with the heat value of the fuel used, so that the heat units (B. t. u.) of the injected fuel charge remain practically constant irrespective of the character of the fuel used, causing a blower to maintain a sufficient supply of air for properly scavenging, cooling and recharging the working cylinder under varying conditions of load and speed, and utilizing a portion of the kinetic energy of the combustion gases to relieve the load on the blower.

3. In a two-stroke internal combustion engine, a working cylinder provided with a piston and with admission and exhaust ports, controllable means for regulating the volume of air compressed in the working cylinder, an auxiliary cylinder provided with a piston and adapted to be connected with the working cylinder at predetermined intervals, a device for introducing into said auxiliary cylinder a predetermined quantity of fuel and a practically fixed volume of gaseous medium, properly timed means for operating said auxiliary piston to compress the mixture of fuel and gaseous medium in said auxiliary cylinder and to inject said compressed prepared fuel mixture into the air charge enclosed in the working cylinder at a lower pressure than said fuel charge, means for so controlling the percentage of fuel and air in the working cylinder that the resultant combustible mixture produces a power stroke of the highest practical efficiency under varying conditions of speed and load, and a blower operable to pass a sufficient current of air through the working cylinder when the exhaust ports are open to properly scavenge, cool and recharge the working cylinder.

4. In a two-stroke internal combustion engine, a working cylinder provided with a piston and with admission and exhaust ports, controllable means for regulating the volume of air compressed in the working cylinder, an auxiliary cylinder provided with a piston and adapted to be connected with the working cylinder at predetermined intervals, a device for introducing into said auxiliary cylinder a predetermined quantity of fuel and a practically fixed volume of gaseous medium, properly timed means for operating said auxiliary piston to compress the mixture of fuel and gaseous medium in said auxiliary cylinder and to inject said compressed prepared fuel mixture into the less highly compressed air charge enclosed in the working cylinder, means for so controlling the percentage of fuel and air in the working cylinder that the resultant combustible mixture produces a power stroke of the highest practical efficiency under varying conditions of speed and load, a blower operable to pass a sufficient current of air through the working cylinder when the exhaust ports are open to properly scavenge, cool and recharge the working cylinder, and connections whereby a portion of the kinetic energy of the combustion gases is utilized to relieve the load on the blower and thereby assist in maintaining a sufficient supply of air for properly scavenging, cooling and recharging the working cylinder under varying conditions of load and speed.

5. In a two-stroke internal combustion engine, a working cylinder provided with a piston and with admission and exhaust ports, controllable means for regulating the volume of air compressed in the working cylinder, an auxiliary cylinder provided with a piston and adapted to be connected with the working cylinder at predetermined intervals, a device for introducing into said auxiliary cylinder a predetermined quantity of fuel and a practically fixed volume of gaseous medium, properly timed means for operating said auxiliary piston to compress the mixture of fuel and gaseous medium in said auxiliary cylinder and to inject said compressed prepared fuel mixture into the less highly compressed air charge enclosed in the working cylinder, means for so controlling the percentage of fuel and air in the working cylinder that the resultant combustible mixture produces a power stroke of the highest practical efficiency under varying conditions of speed and load, means in said device for varying the quantity of fuel introduced into said auxiliary cylinder in accordance with the heat value of the fuel used, so that the heat units (B. t. u.) of the injected fuel charge remain practically constant irrespective of the character of the fuel use, and a blower operable to pass a sufficient current of air through the working cylinder when the exhaust ports are open to properly scavenge, cool and recharge the working cylinder.

6. In a two-stroke internal combustion engine, a working cylinder provided with a piston and with admission and exhaust ports, controllable means for regulating the volume of air compressed in the working cylinder, an auxiliary cylinder provided with a piston and adapted to be connected with the working cylinder at predetermined intervals, a device for introducing into said auxiliary cylinder a predetermined quantity of fuel and a practically fixed volume of gaseous medium, properly timed means for operating said auxiliary piston to compress the mixture of fuel and gaseous medium in said auxiliary cylinder and to inject said compressed prepared fuel mixture into the less highly compressed air charge enclosed in the working cylinder, means for so controlling the percentage of fuel and air in the working cylinder that the resultant combustible mixture produces a power stroke of the highest practical efficiency under varying conditions of speed and load, means in said device for varying the quantity of fuel introduced into said auxiliary cylinder in accordance with the heat value of the fuel used, so that the heat units (B. t. u.) of the injected fuel charge remain practically constant irrespective of the character of the fuel used, a blower operable to pass a sufficient current of air through the working cylinder when the exhaust ports are open to properly scavenge, cool and recharge the working cylinder, and connections whereby a portion of the kinetic energy of the combustion gases is utilized to relieve the load on the blower in maintaining a sufficient supply of air for properly scavenging, cooling and recharging the working cylinder under varying conditions of load and speed.

7. In a two-stroke internal combustion engine, a working cylinder provided with a piston and with admission and exhaust ports, controllable means for regulating the volume of air compressed in the working cylinder, an auxiliary cylinder provided with a piston and adapted to be connected with the working cylinder at predetermined intervals, a device for introducing into said auxiliary cylinder a predetermined quantity of fuel and a practically fixed volume of gaseous medium, properly timed means for operating said auxiliary piston to compress the mixture of fuel and gaseous medium in said auxiliary cylinder and to injet said compressed prepared fuel mixture into the less highly compressed air charge enclosed in the working cylinder, means for so controlling the percentage of fuel and air in the working cylinder that the resultant combustible mixture produces a power stroke of the highest practical efficiency under varying conditions of speed and load, means in said device for varying the quantity of fuel introduced into said auxiliary cylinder in accordance with the heat value of the fuel used, so that the heat units (B. t. u.) of the injected fuel charge remain practically constant irrespective of the character of the fuel used, and means for scavenging and recharging the working cylinder.

8. In a two-stroke internal combustion engine, a working cylinder provided with a piston and with admission and exhaust ports, an auxiliary cylinder provided with a piston and adapted to be connected with the working cylinder at predetermined intervals, a device for introducing into said auxiliary cylinder a predetermined quantity of fuel and a practically fixed volume of gaseous medium, properly timed means for operating said auxiliary piston to compress the mixture of fuel and gaseous medium in said auxiliary cylinder, means for injecting said compressed prepared fuel mixture at the proper moment into the less highly compressed air charge enclosed in the working cylinder, means for so controlling the percentage of fuel and air in the working cylinder that the resultant combustible mixture produces a power stroke of the highest practical efficiency under varying conditions of speed and load, means in said device for varying the quantity of fuel introduced into said auxiliary cylinder in accordance with the heat value of the fuel used, so that the heat units (B. t. u.) of the injected fuel charge remain practically constant irrespective of the character of the fuel used, and means for scavenging and recharging the cylinder.

9. In an internal combustion engine, a working cylinder having a piston operable therein, an auxiliary cylinder provided with a piston and adapted to be connected with the working cylinder at predetermined intervals, mechanism for controlling the introduction into said auxiliary cylinder of a predetermined quantity of fuel and a practically fixed volume of gaseous medium, said mechanism including a fuel nozzle, a regulable passage at said nozzle for the flow of a gaseous medium to draw fuel from said nozzle, a separate passage above said nozzle adapted to communicate with said auxiliary cylinder, said separate passage being arranged to communicate with a source of gaseous medium supply independently of the gaseous medium which flows past said fuel nozzle, and an adjustable valve for controlling the amount of gaseous medium taken into the auxiliary cylinder through said separate passage, whereby the quantity of fuel carried into the auxiliary cylinder by the gaseous medium flowing past said fuel nozzle can be varied in accordance with the heat value of the fuel used, so that the heat units (B. t. u.) of the injected fuel charge remain practically constant irrespective of the character of the fuel used.

In testimony whereof I affix my signature in presence of two witnesses.

FRANZ MÄDLER.

Witnesses:
MAX ABRAHAMSOHN,
MARTHA HOLMBERG.